(12) United States Patent
Um

(10) Patent No.: US 6,812,979 B2
(45) Date of Patent: Nov. 2, 2004

(54) COLOR-SEPARATING APPARATUS FOR LIQUID CRYSTAL PROJECTOR OF SINGLE PANEL TYPE

(75) Inventor: Kee Tae Um, Kunpo (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 09/987,664

(22) Filed: Nov. 15, 2001

(65) Prior Publication Data

US 2002/0057402 A1 May 16, 2002

(30) Foreign Application Priority Data

Nov. 15, 2000 (KR) .................................... 2000-0067685

(51) Int. Cl.⁷ ........................................... G02F 1/1335
(52) U.S. Cl. .................... 349/106; 349/107; 349/104; 349/105; 359/234; 359/235; 359/236; 359/230; 359/227; 359/888
(58) Field of Search ................................ 349/104–107, 349/80, 97, 109; 359/234–236, 227, 230, 888, 54

(56) References Cited

U.S. PATENT DOCUMENTS

| | | | | |
|---|---|---|---|---|
| 5,207,000 A | * | 5/1993 | Chang et al. | ................. 33/1 N |
| 6,011,640 A | * | 1/2000 | Hutton | ........................ 359/234 |
| 6,597,409 B1 | * | 7/2003 | Shioya et al. | ................ 348/743 |
| 2002/0008812 A1 | * | 1/2002 | Conner et al. | .............. 349/106 |

* cited by examiner

Primary Examiner—Jerome Jackson
Assistant Examiner—Joseph Nguyen
(74) Attorney, Agent, or Firm—Fleshner & Kim, LLP

(57) ABSTRACT

A color-separating apparatus for a liquid crystal projector of single panel type that is capable of improving light efficiency and color revival property. In the apparatus, a color filter has red, green and blue colors formed in a spiral shape. A reflective plate is opposed to the color filter to reflect an incident light reflected and emitted from the color filter into the color filter again. Accordingly, a color light is transmitted with no light loss.

17 Claims, 21 Drawing Sheets

COLOR-SEPARATING APPARATUS FOR LIQUID CRYSTAL PROJECTOR OF SINGLE PANEL TYPE

BACKGROUND OF THE INVENTION

1. Field of the Invention

This invention relates to a color-separating apparatus for a liquid crystal projector, and more particularly to a color-separating apparatus for a liquid crystal projector of single panel type that is capable of improving light efficiency and color revival property.

2. Description of the Related Art

Generally, a projector projects a minute picture implemented at an internal small-dimension display onto a large-dimension screen with the aid of a projective lens on an expanded scale, thereby displaying a large-scale picture. This projector can be classified into a front projection system in which a picture is projected onto the front side of the screen and a rear projection system in which a picture is projected onto the rear side of the screen. A typical rear projection system of these systems includes a projection television. In the projector, a cathode ray tube (CRT) or a liquid crystal display (LCD) is used as a display device for providing a small-scale image. Recently, there has been highlighted a liquid crystal projector employing the LCD device profitable for making a thin-thickness projector.

The liquid crystal projector generally include a LCD device for providing a picture, a projection lens system for projecting the implemented picture onto the screen on an expanded scale, a light source for providing the LCD device with a light, an illuminating system for controlling a light path between the light source and the LCD device, and a driving circuitry for processing a signal.

The liquid crystal projector trends toward a realization of high brightness resulting from a configuration of better efficient optical system and a modification of a lamp system, or trends toward a simplicity of carrying and installation resulting from an implementation of small-size and light-weight device in spite of a reduced brightness. Such a liquid crystal projector uses a single or three LCD devices for a color realization. Generally, three LCD devices are employed if a high brightness is intended, whereas a single LCD device is employed if an implementation of small size and lightweight device is intended. A liquid crystal projector of single panel type adopting a single LCD device takes advantage of any one of a strategy of using a color filter, a strategy of separating three primary colors and inputting them at a specific angle and a strategy of sequentially sending three primary colors to the LCD device, for color realization's sake. A picture-projecting apparatus in which three primary colors are sequentially sent to the LCD device typically employs a color wheel as shown in FIG. 1.

Referring to FIG. 1, a conventional optical system of a liquid crystal projector employing the color wheel includes a light source 2 for generating a white light, a color wheel 4 for transmitting only a specific color light of the white light from the light source 2, a condensing lens 6 for condensing a light, a polarizing prism 8 for reflecting and transmitting an incident light depending on a polarization direction thereof, a LCD device 10 for reflecting a light in an image signal to implement a picture light loaded with picture information, and a projective lens 12 for projecting a picture light from the LCD device 10 on an expanded scale.

The color wheel 4 is rotated by means of a motor 14 to transmit only a specific color light of a white light emitted from the light source 2 in accordance with its position. To this end, the color wheel 4 is divided into first to fourth filters 4A, 4B, 4C and 4D as shown in FIG. 2. The first to fourth filters 4A, 4B, 4C and 4D are coated or colored such that they can have a different color transmission characteristic, thereby transmitting red(R), green(G), blue(B) and white (W) lights, respectively. Such a color wheel 4 is rotated to position the first to fourth color filters 4A, 4B, 4C and 4D on a light path on a time-sequence basis, thereby allowing the red(R), green(G), blue(B) and white(W) lights on a time-sequence basis.

The condensing lens 6 focuses the color lights emitted from the color wheel 4 onto the polarizing prism 8. The polarizing prism 8 reflects a line-polarized light having a specific direction, that is, a S wave inputted from the condensing lens 6 into the LCD device 10 and, at the same time, outputs a P wave from the LCD device 10 to the projective lens 12.

The LCD device 10 is a reflective-type device, which continuously realizes red, green and blue picture in response to color lights reflected from the polarizing prism 8 and being incident thereto. The color picture continued by the LCD device 10 passes through the polarizing prism 8 and then is projected on a screen (not shown) on an expanded scale via the projective lens 12. In this case, an observer recognizes a combined color picture in which specific color pictures projected onto the screen are averaged on a time basis.

However, if the color wheel 4 shown in FIG. 1 is used, then there is raised a problem in that total light efficiency of the system is reduced to approximately ⅓ because all lights other than color lights transmitting the first to fourth filters 4A, 4B, 4C and 4D are reflected.

In order to compensate for this problem, there has been suggested an optical system employing a Dichroic mirror for a color separation and a rotation prism for converting progress directions of the separated color lights as shown in FIG. 3.

Referring to FIG. 3, the optical system of the liquid crystal projector includes a fly eye lens 18 and a polarizing beam splitter (PBS) array 20 arranged between on a light path between a light source 16 for generating a light and a first Dichroic mirror 24 for separating the light, first to sixth Dichroic mirrors 24, 28, 32, 46, 48 and 54 for transmitting and reflecting a specific wavelength band of light, first to third rotating prism 34, 38 and 42 for changing a light path in accordance with a rotation angle, a polarizing prism 60, and a LCD device 62.

The fly eye lens 18 divides a white light emitted from the light source 16 for each cell unit to focus it onto a specific area of the PBS array 20. The PBS array 20 separates an incident light into line-polarized lights having any one light axis, that is, a P wave and a S wave, and allows the S wave to be outputted as it is while allowing the P wave to be converted into a S wave with the aid of a half wavelength (½λ) plate (not shown) partially attached to the rear side of the PBS array 20 so as to output the S wave. The first condensing lens 22 prevents a spread of a light emitted from the PBS array 20 and being incident to the first Dichroic mirror 24. The first Dichroic mirror 24 reflects and transmits incident lights in accordance with a wavelength band to separate them.

For instance, the first Dichroic mirror 24 reflects a red light of the incident lights while transmitting a green light and blue light. The second Dichroic mirror 28 reflects a red light reflected from the first Dichroic mirror 24 and being incident thereto via a second condensing lens 26 into the first rotating prism 34. The third Dichroic mirror 32 reflects a green light of lights transmitting the first Dichroic mirror 24 and being incident thereto via a third condensing lens 30 for allowing it to be progressed toward the second rotating prism 36 while transmitting a blue light for allowing it to be progressed toward the third rotating prism 42.

Each of the first to third rotating prism 34, 38 and 42 differentiates a progress direction of the red, green and blue lights in accordance with its rotation angle as shown in FIG. 4A to FIG. 4C. In other words, each of the first to third rotating prism 34, 38 and 42 differentiates positions of the red, green and blue lights imaged on the LCD device 62 depending on its rotation angel as shown in FIG. 5A and FIG. 5B. The red light transmitting the first rotating prism 34 is incident to the sixth Dichroic mirror 54 via a fourth condensing lens 36, the fourth Dichroic mirror 46 and a fifth condensing lens 50. The green light transmitting the second rotating prism 38 is incident to the sixth Dichroic mirror via a sixth condensing lens 40, the fourth Dichroic mirror 46 and the fifth condensing lens 50. The blue light transmitting the third rotating prism 42 is incident to the sixth Dichroic mirror 54 via a seventh condensing lens 44, the fifth Dichroic mirror 48 and an eighth condensing lens 52. The sixth Dichroic mirror 54 reflects incident red and green lights while transmitting an incident blue light. Each of the red, green and blue lights is incident to the polarizing prism 60 via a ninth condensing lens 56 and a polarizer 58 and then is reflected by the polarized prism 60 to be incident to the LCD device 62. In this case, as rotation angles of the first to third polarizing prisms 34, 38 and 42 are different from each other, the red, green and blue lights are imaged at a different area of the reflective LCD device 62 as shown in FIG. 6. Positions of the red, green and blue lights 62A, 62B and 62C imaged on the LCD device 62 in accordance with a rotation angle of the first to third rotating prisms 34, 38 and 42 rotated at a fast speed become different as they are continuously progressed in a certain direction as shown in FIG. 6. The LCD device 62 expresses red, green and blue color signals in conformity to red, green and blue lights being incident thereto with having imaged positions changed at such a fast speed, and continuously changes the color signals at a speed identical to a flow of the lights imaged on the LCD device 62. Accordingly, red, green and blue color image signals are sequentially implemented at any one area of the LCD device 62, so that an observer recognizes a signal integrated on a time basis.

The liquid crystal projector of single panel type employing the rotating prisms has an enhanced light efficiency because a light loss according to the color realization does almost not exist, but raises a synchronization problem of the rotating prisms. Particularly, although rotation timing between the rotating prisms is consistent at an initial time, it causes a gradual difference due to a deviation between driving devices of the rotating prisms with a lapse of time after a configuration of the system. If synchronization between the rotating prisms goes amiss, then color realization ability on the screen is deteriorated. Furthermore, if a lot of rotating prisms are used, then a lot of optical elements are required and an accurate color control is required, to cause a high cost.

SUMMARY OF THE INVENTION

Accordingly, it is an object of the present invention to provide a color-separating apparatus for a liquid crystal projector of single panel type that is capable of improving light efficiency and color revival property.

In order to achieve these and other objects of the invention, a color wheel apparatus according to one aspect of the present invention includes a color filter in which red, green and blue colors are formed in a spiral shape; and a reflective plate opposed to the color filter to reflect an incident light reflected and emitted from the color filter into the color filter again.

In the color wheel apparatus, the color filter takes a spiral shape in which red, green and blue colors are entered toward the rotation center direction.

The color filter is provided on a circular plate, and the reflective plate is provided at the rear side of the circular plate.

The reflective plate has a relatively smaller size than the color filter.

A color-separating apparatus for a liquid crystal projector of single panel type according to another aspect of the present invention includes a color wheel including a color filter in which red, green and blue colors are formed in a spiral shape, and a reflective plate opposed to the color filter to reflect an incident light reflected and emitted from the color filter into the color filter again; a condensing lens for focusing a color light emitted from the color wheel; a polarizing prism for reflecting and transmitting an incident light inputted from the condensing lens in accordance with a polarized direction; a display device for reflecting the color light reflected from the polarizing prism and being incident thereto in accordance with an image signal to implement a picture light loaded with picture information; and a projective lens for projecting the picture light from the display device on an expanded scale.

In the color-separating apparatus, the color filter takes a spiral shape in which red, green and blue colors are entered toward the rotation center direction.

The color filter is provided on a circular plate, and the reflective plate is provided at the rear side of the circular plate.

The reflective plate has a relatively smaller size than the color filter.

A color-separating apparatus for a liquid crystal projector of single panel type according to still another aspect of the present invention includes a color wheel having alternating red, green and blue concentric circles; and a full-reflecting mirror, being fixed to an incidence surface of the color wheel, for reflecting an incident light reflected and emitted from the incidence surface of the color wheel toward the color wheel.

In the color-separating apparatus, the full-reflecting mirror is fixed to the incidence surface of the color wheel in parallel.

The color wheel has the red, green and blue concentric circles spaced at the same distance d (wherein d is a positive number meeting a relationship of d>0).

A rotation axis of the color wheel makes a non-axial rotating motion at a position spaced at the same distance d from a center axis of the concentric circles.

The color-separating apparatus further includes a driving motor for making a non-axial rotation motion of the color wheel.

The color-separating apparatus further includes a condensing lens for focusing a color light emitted from the color wheel; a polarizing prism for reflecting and transmitting an incident light inputted from the condensing lens in accordance with a polarized direction; a display device for reflecting the color light reflected from the polarizing prism and being incident thereto in accordance with an image signal to implement a picture light loaded with picture information; and a projective lens for projecting the picture light from the display device on an expanded scale.

The color wheel includes five color areas consisting of red, green, blue, red and green color areas to image an illuminating light on three areas of the five color areas.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
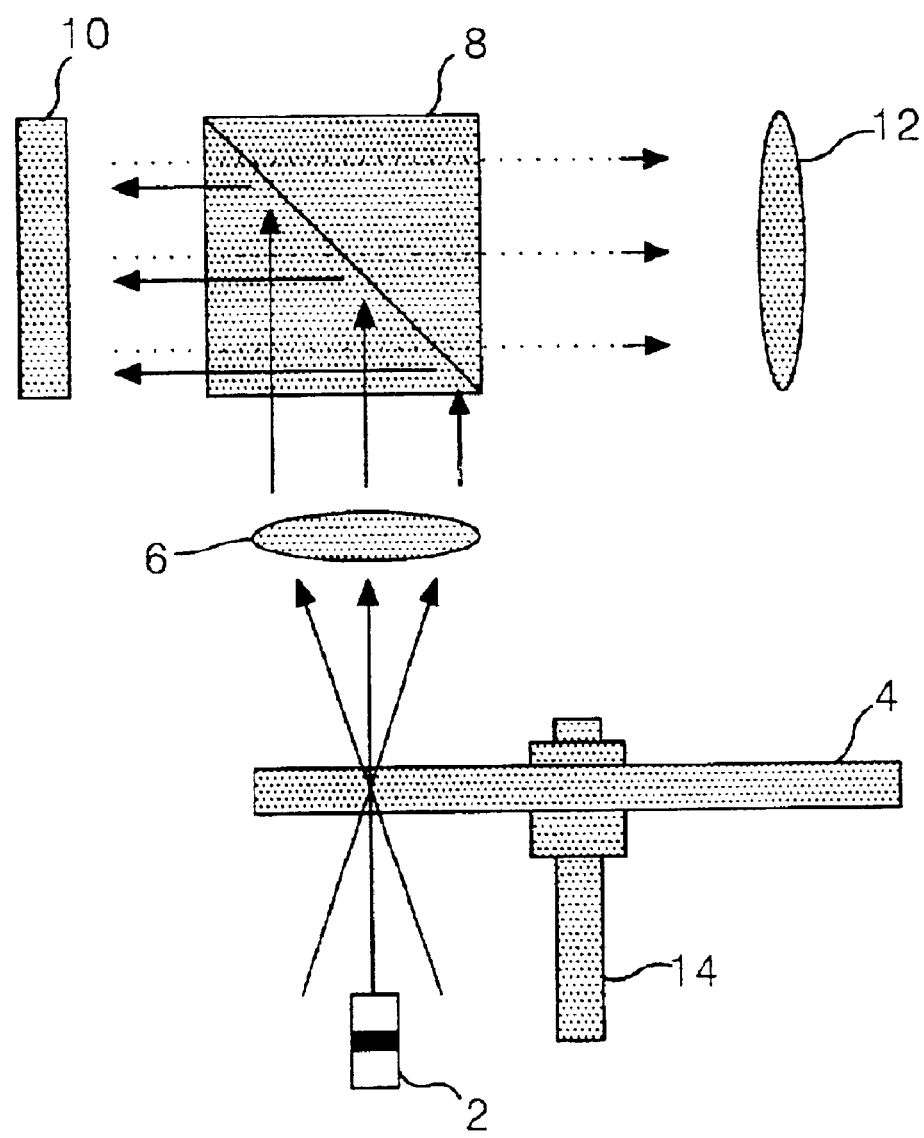
FIG. 1 illustrates an arrangement of an optical system of a conventional projector employing a color wheel.
Figure 2:
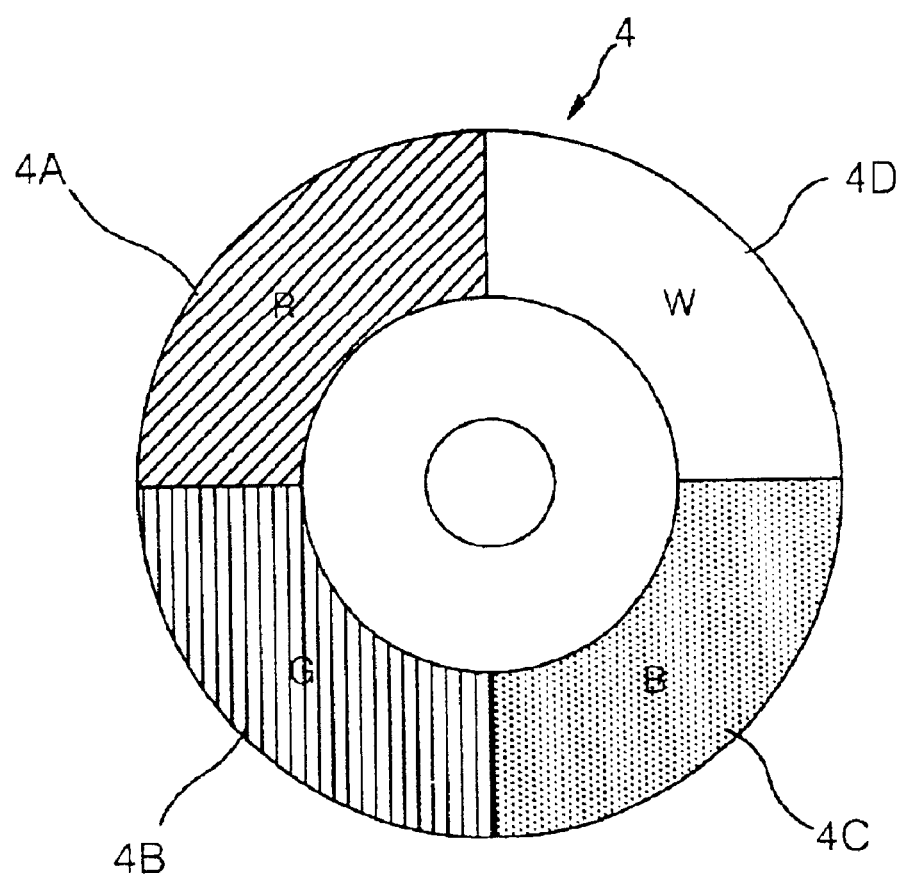
FIG. 2 depicts color filters of the color wheel shown in FIG. 1.
Figure 3:
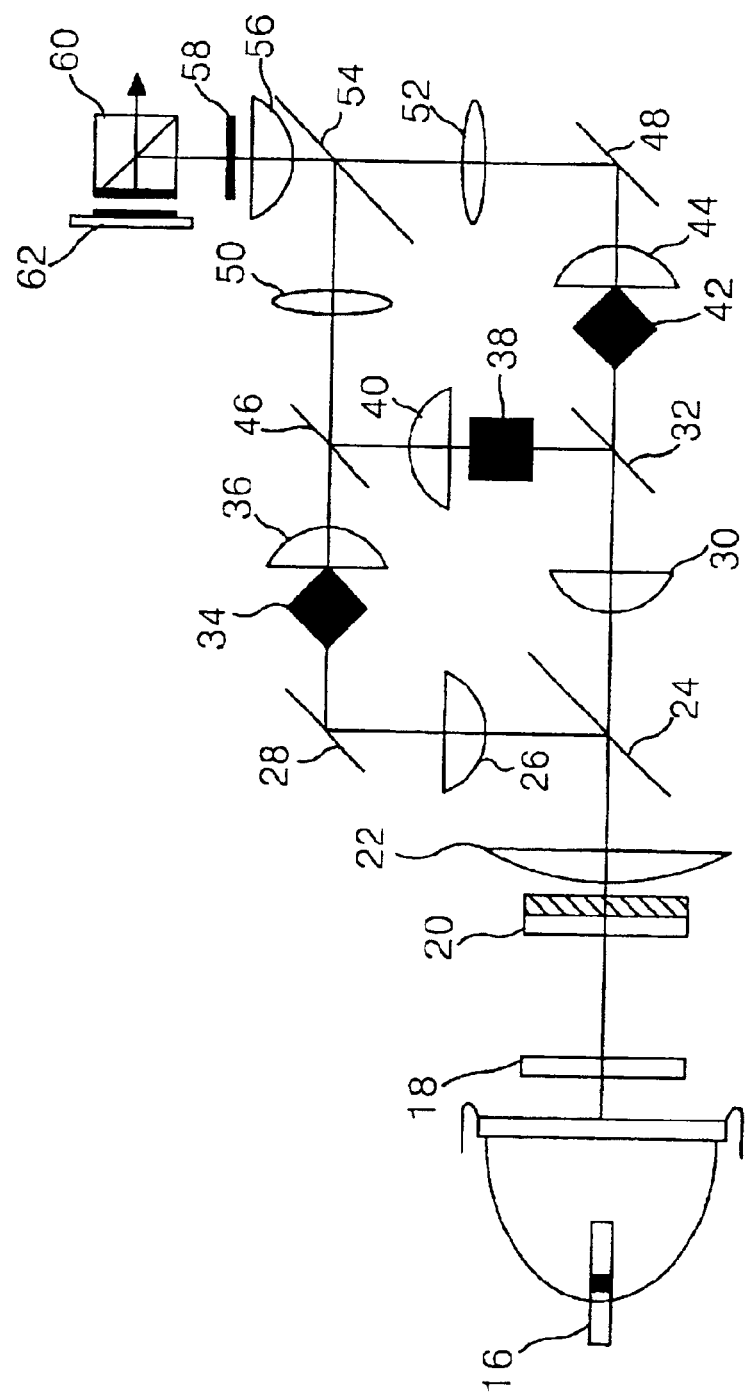
FIG. 3 illustrates an arrangement of an optical system of a conventional projector employing rotating prisms.
Figure 4A:
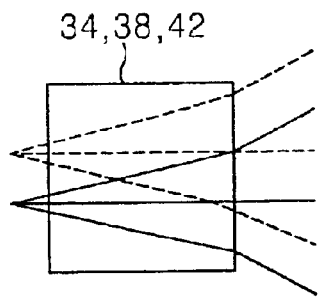
FIG. 4A to FIG. 4C are views for explaining an operation principle of the rotating prisms shown in FIG. 3.
Figure 4B:
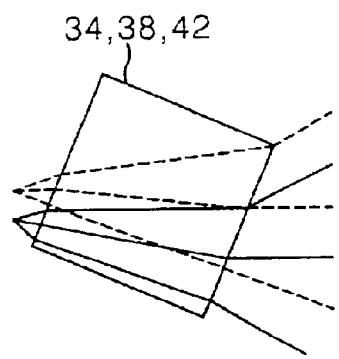
Figure 4C:
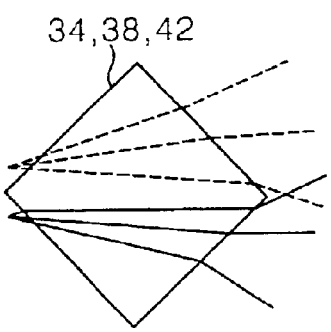
Figure 5A:
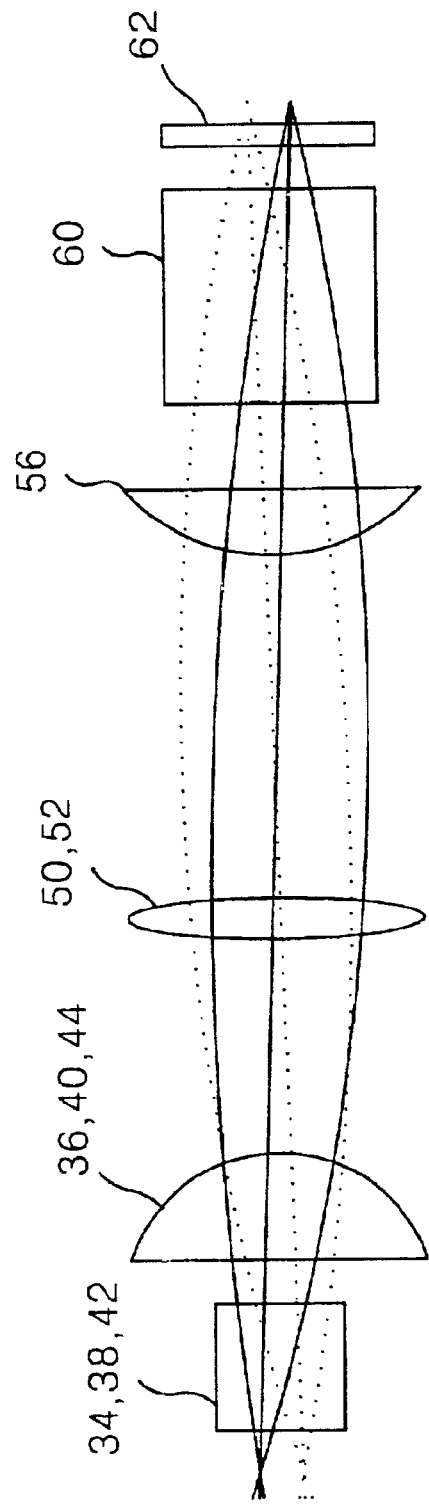
FIG. 5A and FIG. 5B show positions at which red, green and blue lights are imaged on a liquid crystal display device in accordance with a rotation angle of the rotating prisms shown in FIG. 3.
Figure 5B:
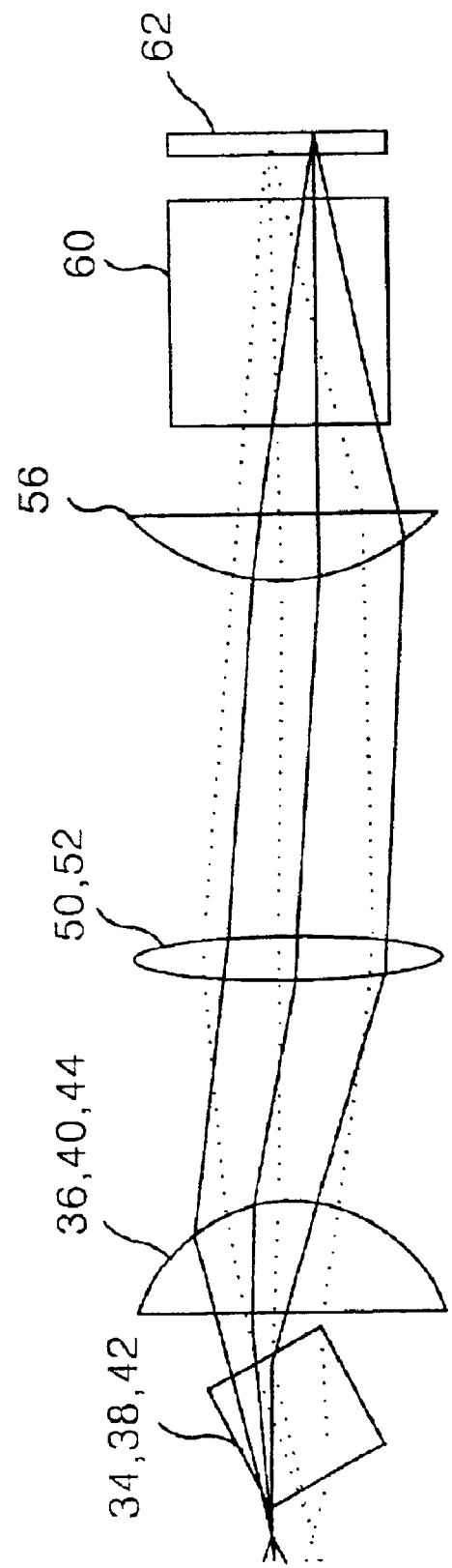
Figure 6:
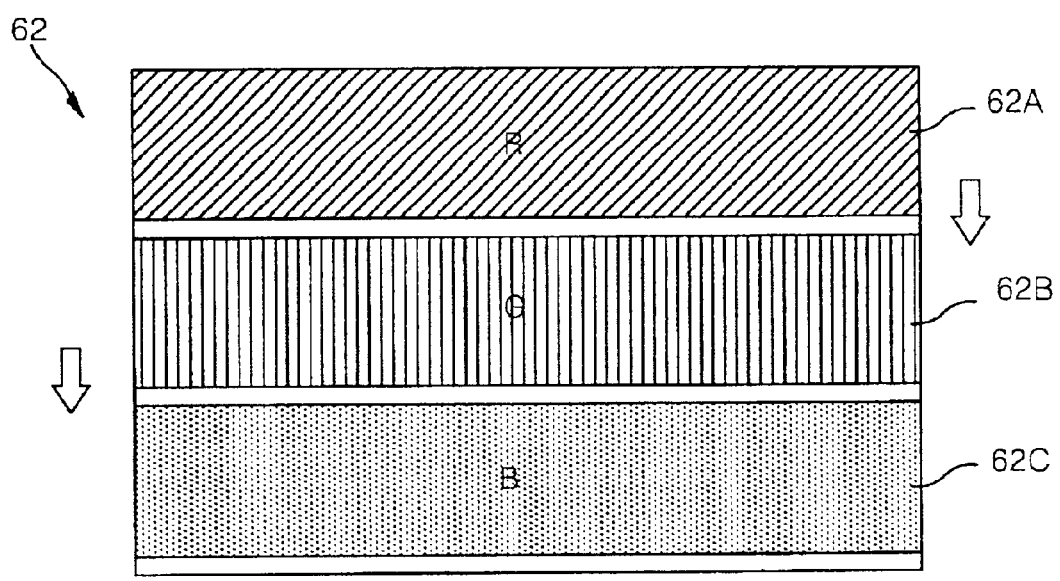
FIG. 6 depicts a field imaged on the liquid crystal display device by means of the rotating prisms shown in FIG. 3.
Figure 7:
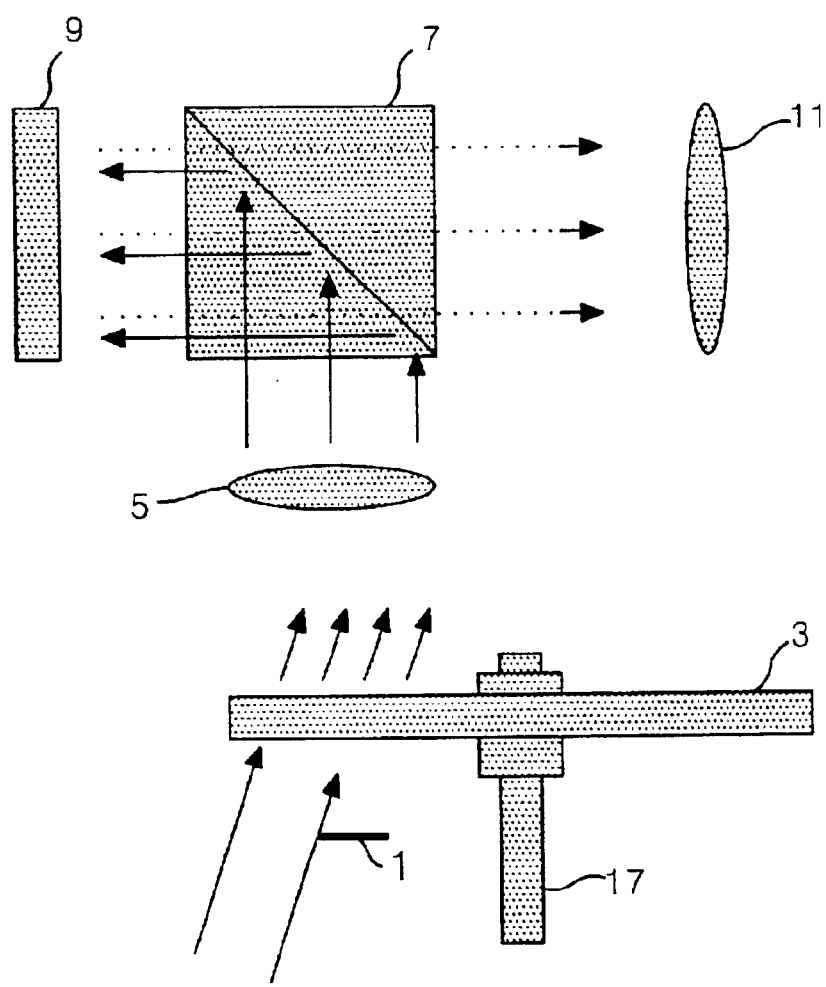
FIG. 7 illustrates a configuration of a color-separating apparatus for a liquid crystal projector of single panel type according to a first embodiment of the present invention.

Referring to FIG. 7, there is shown an optical system of a liquid crystal projector of single panel type according to a first embodiment of the present invention.

The optical system of the single panel-type liquid crystal projector includes a full-reflecting mirror 1 for reflecting an incident illuminating light reflected and emitted from a band pass filter area into the band pass filter again, a color wheel 3 for transmitting only a specific color light of a white light, a condensing lens 5 for focusing a light, a polarizing prism 7 for reflecting and transmitting an incident light in accordance with a polarized direction, a liquid crystal display (LCD) device 9 for reflecting a light in accordance with an image signal to implement it into a picture light loaded with picture information, and a projective lens 11 for projecting the picture light from the LCD device 9 on an expanded scale.

The full-reflecting mirror 1 is mechanically fixed, and the color wheel 3 makes a rotating motion in a direction parallel to the full-reflecting mirror 1 by means of a motor 17 to transmit only a specific color light of a white light emitted from a light source (not shown).

Figure 8:
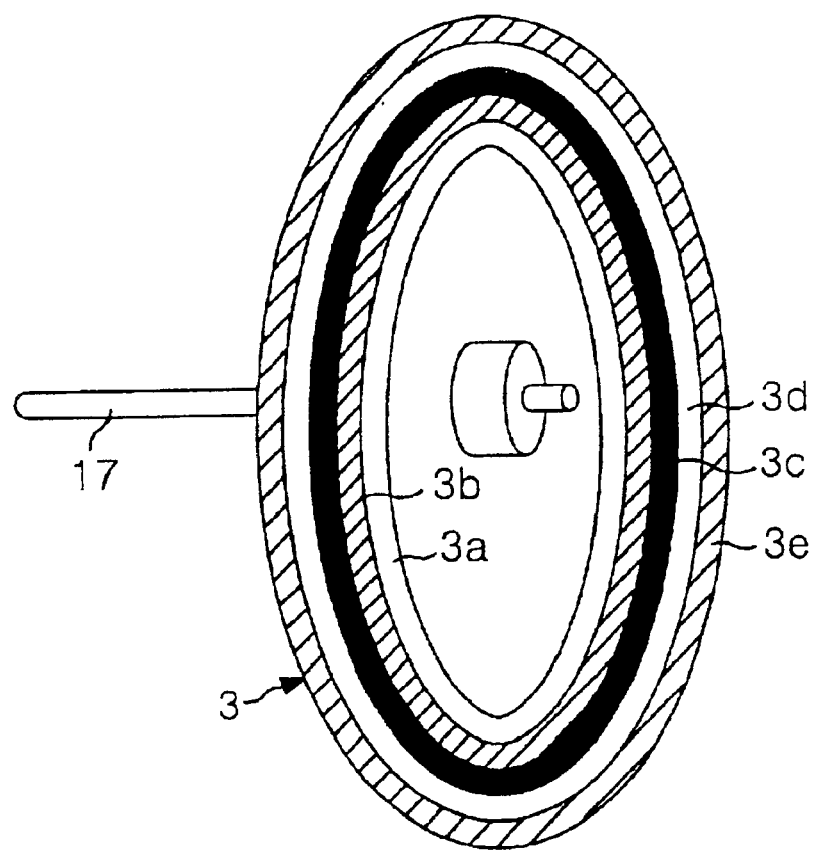
FIG. 8 shows the color wheel in FIG. 7.

By operations of the full-reflecting mirror 1 and the reflecting and transmitting surfaces of the color wheel 3, an illuminating light entering a white light is separated into red, green and blue lights with no loss when it is emitted through the color wheel 3 and then outputted. To this end, the color wheel 3 is divided into five color areas as shown in FIG. 8. Each of the five color areas 3a, 3b, 3c, 3d and 3e transmits the corresponding one color light while reflecting other color lights. Three color areas of the first to fifth color areas 3a, 3b, 3c, 3d and 3e make imaging planes to be imaged on the LCD device 9 into an illuminating light by means of the condensing lens 5. The condensing lens 5 focuses a color light emitted from the color wheel 3 onto the polarizing prism 7. The polarizing prism 7 reflects a line-polarized light having a specific direction, that is, a S wave inputted from the condensing lens 5 into the LCD device 9 and, at the same time, outputs a P wave from the LCD device 9 to the projective lens 11.

The LCD device 9 is a reflective-type device, which continuously realizes red, green and blue picture in response to color lights reflected from the polarizing prism 7 and being incident thereto. The color picture continued by the LCD device 9 passes through the polarizing prism 7 and then is projected on a screen (not shown) on an expanded scale via the projective lens 11. In this case, an observer recognizes a combined color picture in which specific color pictures projected onto the screen are averaged on a time basis.

Figure 9A:
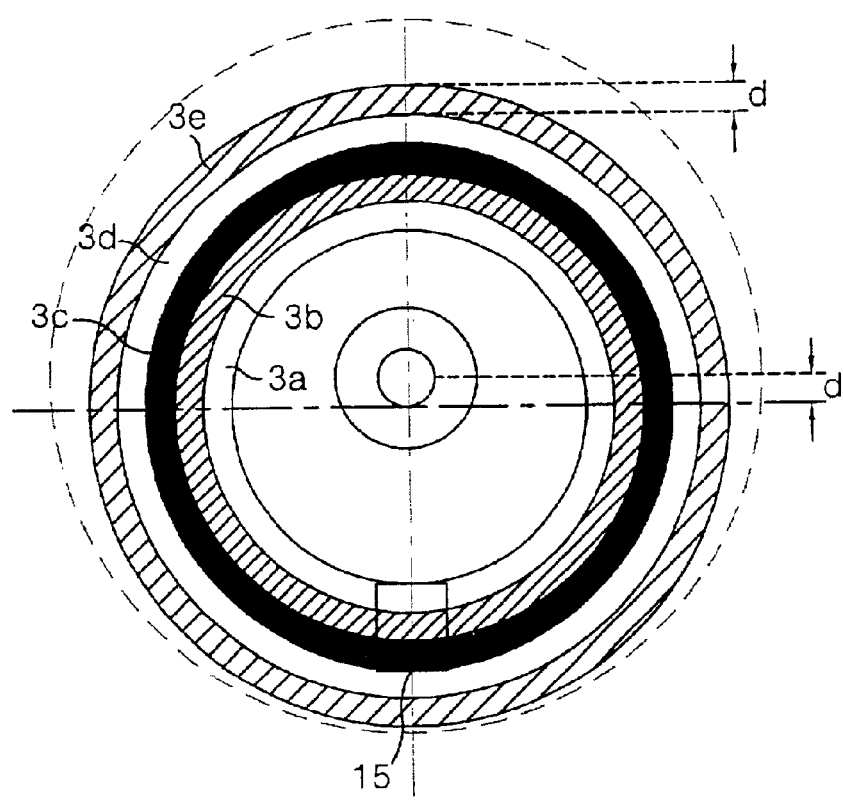
FIG. 9A to FIG. 9C show the color transmission surface in FIG. 7.

The transmitting surface of the color wheel 3 is formed such that red, green and blue concentric circles spaced at the same distance d are made alternately as shown in FIG. 9A. A rotation axis of the color wheel 3 is located at a position departing from center axes of the concentric circles at the same distance d to make a non-axial rotation so as to prevent a shake upon rotation. In this case, the red, green and blue concentric circles are formed from red, green and blue band pass filter coatings, respectively. A color realization according to the first embodiment of the present invention is as shown in FIG. 9A to FIG. 10C.

Figure 9B:
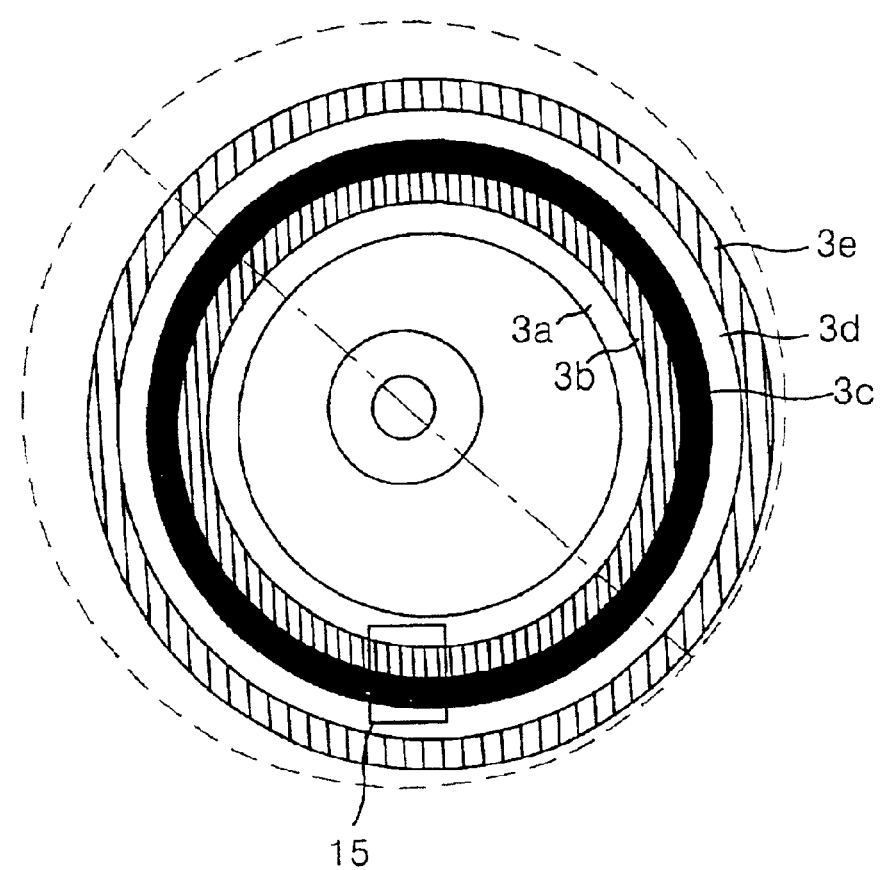
Figure 9C:
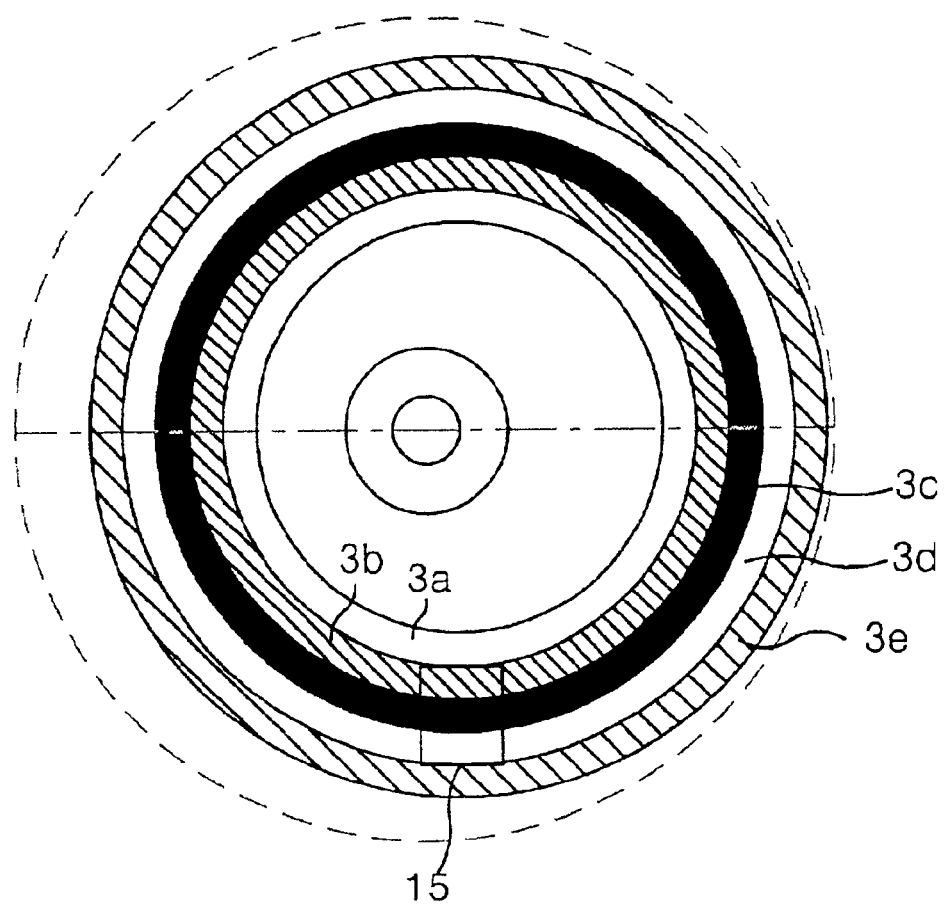
Figure 10A:
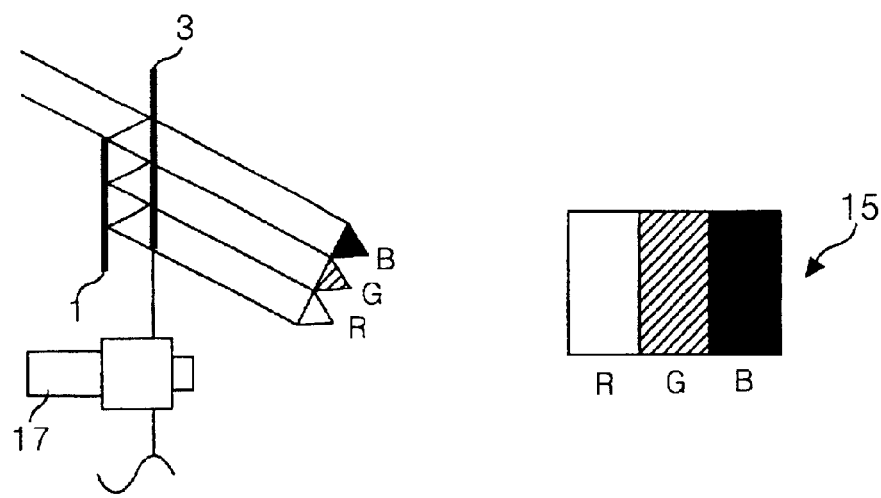
FIG. 10A to FIG. 10C are views for explaining a color realization of the color-separating apparatus for the liquid crystal projector shown in FIG. 7.
Figure 10B:
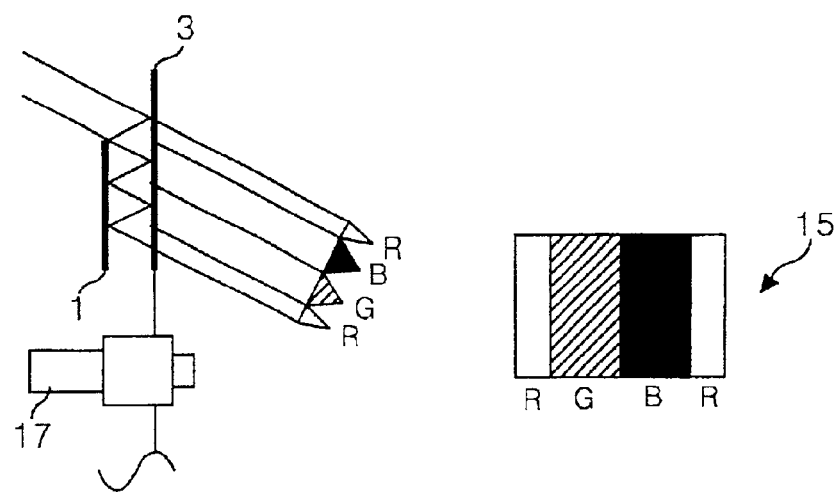
Figure 10C:
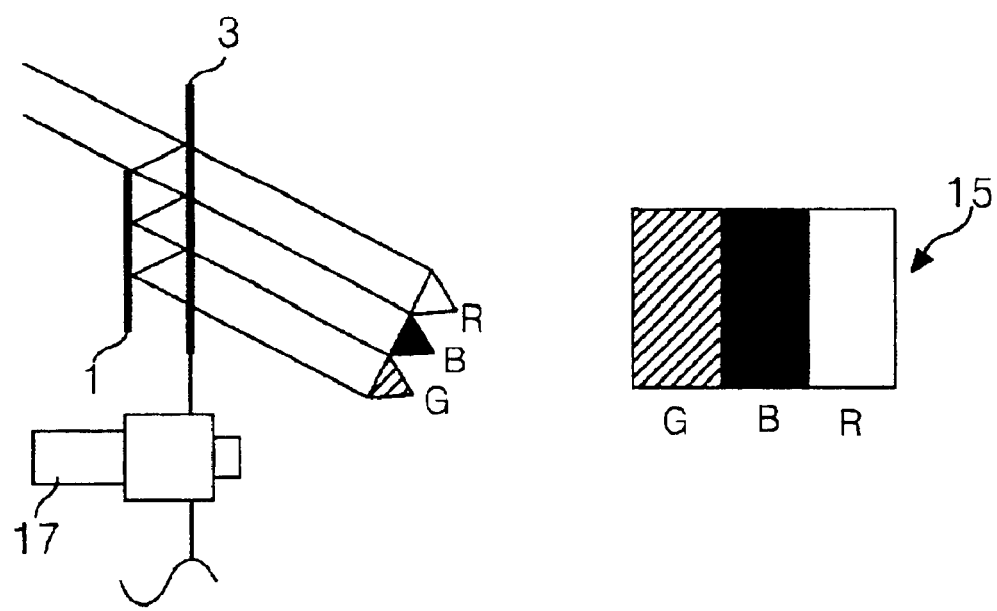

If the color wheel 3 is rotated at 0° by means of the motor 17, then a white light being inputted as shown in FIG. 9A and FIG. 10A allows the corresponding color lights having the same magnitude to be emitted from the red, green and blue areas. When the imaged plane 15 according to the emitted color lights is made on the LCD device 9, red, green and blue lights having the same magnitude are imaged on the LCD device 9. Subsequently, if the color wheel 3 is rotated at 45° by means of the motor 17, then a white light inputted as shown in FIG. 9B and FIG. 10B allows the corresponding color lights having a different magnitude to be emitted from the red, green and blue areas. When the imaged plane 15 according to the emitted color lights is made on the LCD device 9, red, green, blue and red colors are imaged on the LCD device 9. Finally, If the color wheel 3 is rotated at 90° by means of the motor 17, then a white light being inputted as shown in FIG. 9C and FIG. 10C allows the corresponding color lights having the same magnitude to be emitted from the red, green and blue areas. When the imaged plane 15 according to the emitted color lights is made on the LCD device 9, red, green and blue lights having the same magnitude are imaged on the LCD device 9.

When such a rotation continuously occurs, a color is scrolled. In other words, if the scrolled color areas at the imaged plane 15 are imaged on the LCD device 9, then a color is imaged on the LCD device into a scroll shape on a time basis. Then, the LCD device 9 is synchronized with a scrolling time of the color area to implement a color signal, thereby projecting it onto the screen on an expanded scale via the projective lens 11. Accordingly, an observer can recognize the scrolled red, green and blue color signals integrated on a time basis to realize an intended real color picture.

Figure 11:
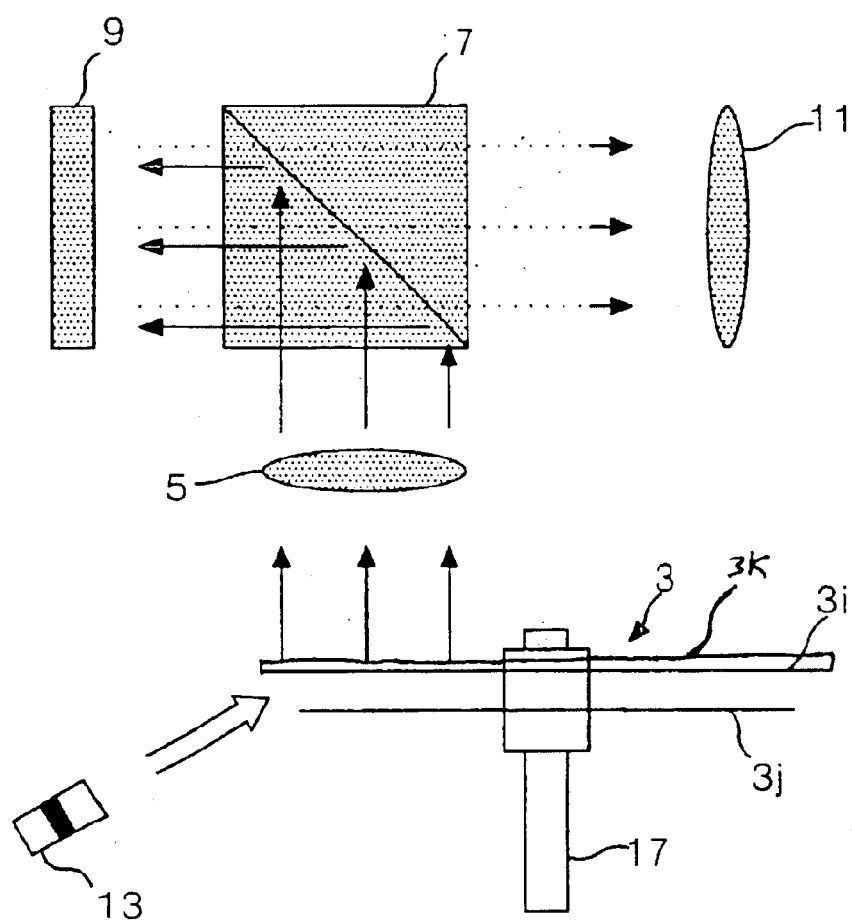
FIG. 11 illustrates a configuration of a color-separating apparatus for a liquid crystal projector of single panel type according to a second embodiment of the present invention.

Referring to FIG. 11, there is shown an optical system of a liquid crystal projector of single panel type according to a second embodiment of the present invention.

The optical system of the single panel-type liquid crystal projector includes a light source 2 for generating a white light, a color wheel 3 for transmitting an incident light in accordance with red, green and blue coating patterns, a condensing lens 5 for focusing a light, a polarizing prism 7 for reflecting and transmitting an incident light in accordance with a polarized direction, a liquid crystal display (LCD) device 9 for reflecting a light in accordance with an image signal to implement it into a picture light loaded with picture information, and a projective lens 11 for projecting the picture light from the LCD device 9 on an expanded scale.

Figure 12:
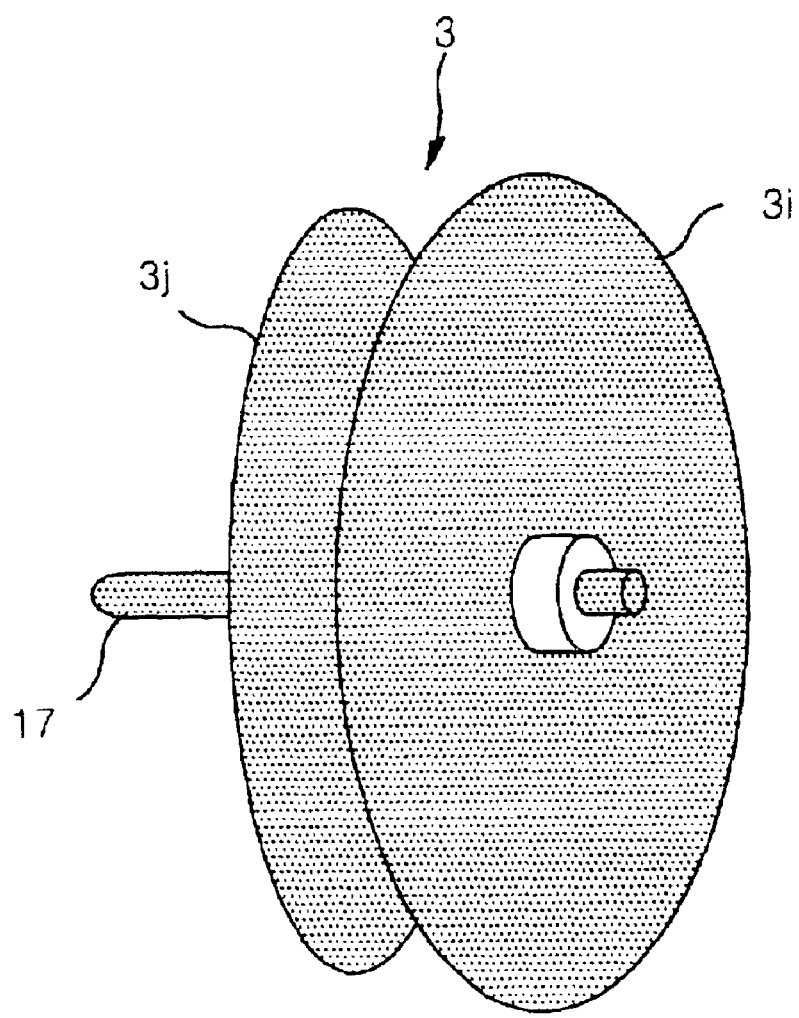
FIG. 12 shows the color wheel in FIG. 11.

The color wheel 3 is fixed to the motor 17, and consists of a color filter 3i and a reflective plate 3j as shown in FIG. 12. The color filter 3i transmits an incident light in accordance with the red, green and blue coating patterns corresponding to the incidence surfaces, and the reflective plate 3j is opposed to the color filter 3i at a relatively smaller size than the color filter 3i to reflect an incident light into the color filter 3i.

A formation process of the color filter 3i in such a color wheel 3 will be described below.

Figure 13:
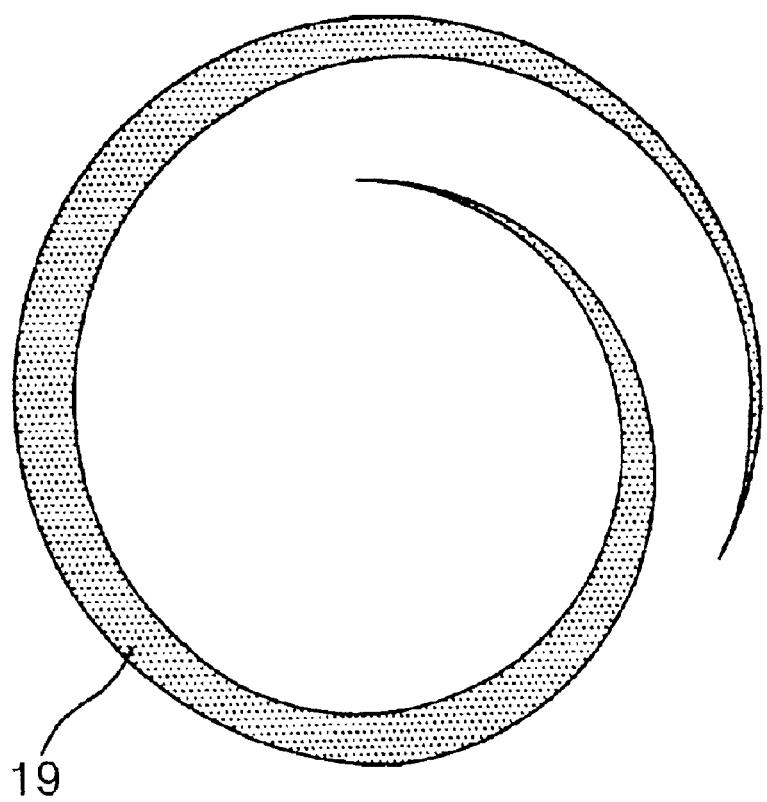
FIG. 13 depicts a mask for providing the color wheel shown in FIG. 11.
Figure 14:
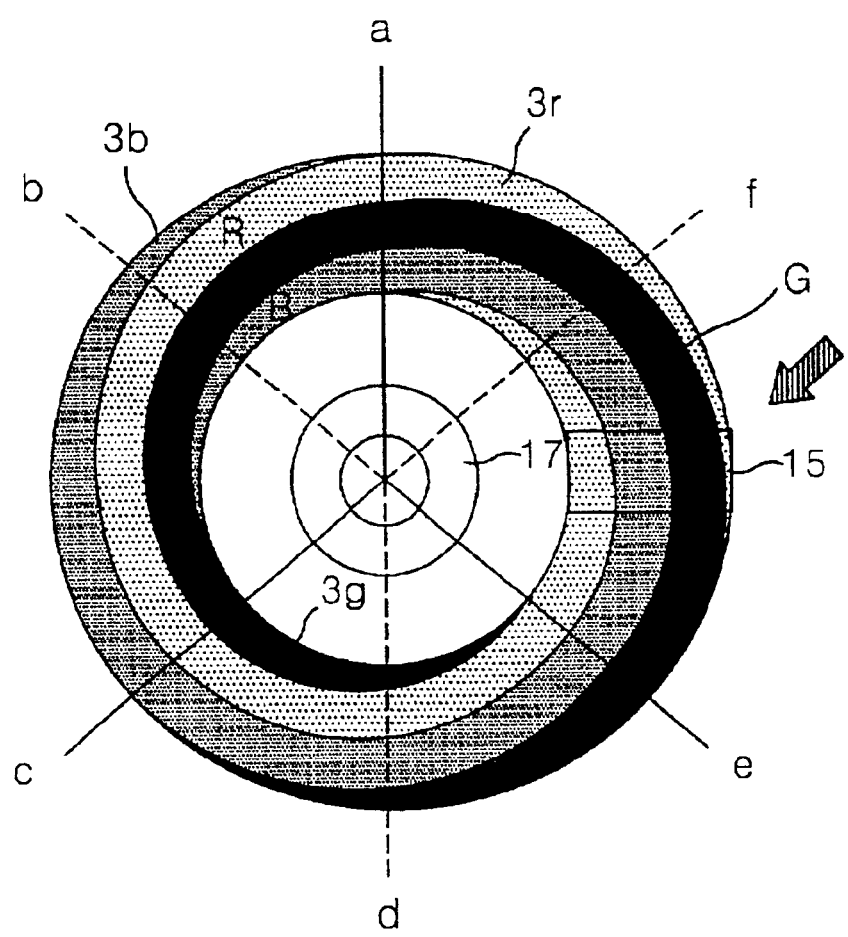
FIG. 14 depicts color filters of the color wheel shown in FIG. 11.

First, in order to make a color coating circular plate, a spiral shape of mask 19 going toward the center direction as shown in FIG. 13 are prepared. The mask 19 can be rotated accurately for each 120°. With the aid of the mask 19, a jig for allowing a light to be transmitted only at the mask area is made. A circular plate (e.g., circular plate 3k) is put on the jig. Next, a dichroic coating for any one of red, green and blue colors is made on the circular plate and thereafter the circular plate is rotated by 120° at a time to make a dichroic coating for the remaining colors sequentially. When red, green and blue colors haven been coated on the circular plate along the mask 19, a spiral color filter 3i in which red, green and blue colors are entered in the center direction thereof as shown in FIG. 14 is made.

With the aid of such a color filter 3 having the color filter 3i and the reflective plate 3j, an illuminating light entering a white light is separated into red, green and blue lights with no loss when it is emitted through the color wheel 3 and then outputted. The condensing lens 5 focuses a color light emitted from the color wheel 3 onto the polarizing prism 7. The polarizing prism 7 reflects a line-polarized light having a specific direction, that is, a S wave inputted from the condensing lens 5 into the LCD device 9 and, at the same time, outputs a P wave from the LCD device 9 to the projective lens 11.

The LCD device 9 is a reflective-type device, which continuously realizes red, green and blue picture in response to color lights reflected from the polarizing prism 7 and being incident thereto. The color picture continued by the LCD device 9 passes through the polarizing prism 7 and then is projected on a screen (not shown) on an expanded scale via the projective lens 11. In this case, an observer recognizes a combined color picture in which specific color pictures projected onto the screen are averaged on a time basis.

Hereinafter, a color realization according to the second embodiment of the present invention will be described with reference to FIG. 15A to FIG. 15F.

Figure 15A:
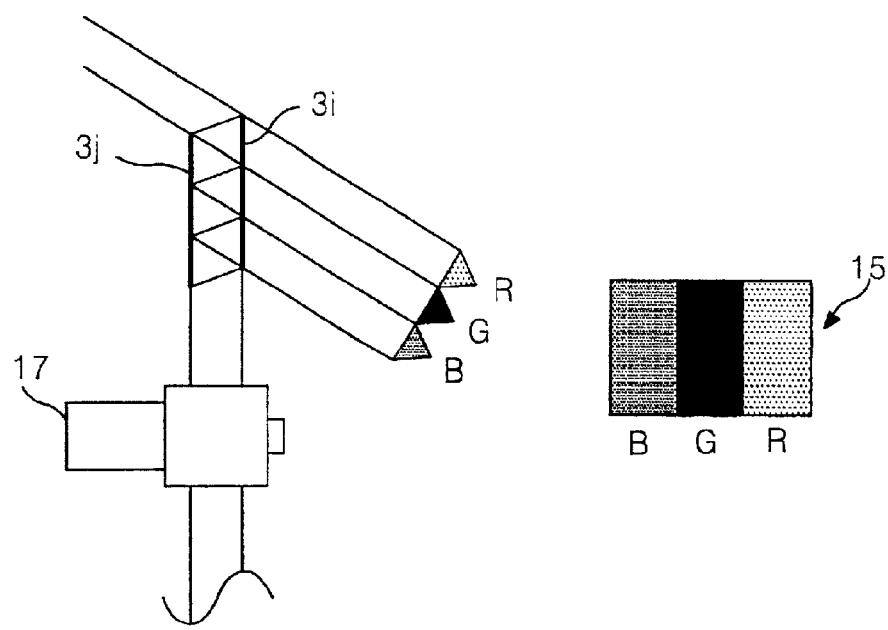
FIG. 15A to FIG. 15F are views for explaining a color realization of the color-separating apparatus for the liquid crystal projector shown in FIG. 14.

The color filter 3i positioned at 'a' area in FIG. 14 is coated with red, green and blue colors 3r, 3g and 3b at the same width. Accordingly, a white light being inputted as shown in FIG. 15A allows the corresponding color lights having the same magnitude to be emitted from the red(R), green(G) and blue(B) areas. When the imaged plane 15 according to the emitted color lights is made on the LCD device 9, red(R), green(G) and blue(B) lights having the same width are imaged on the LCD device 9.

Figure 15B:
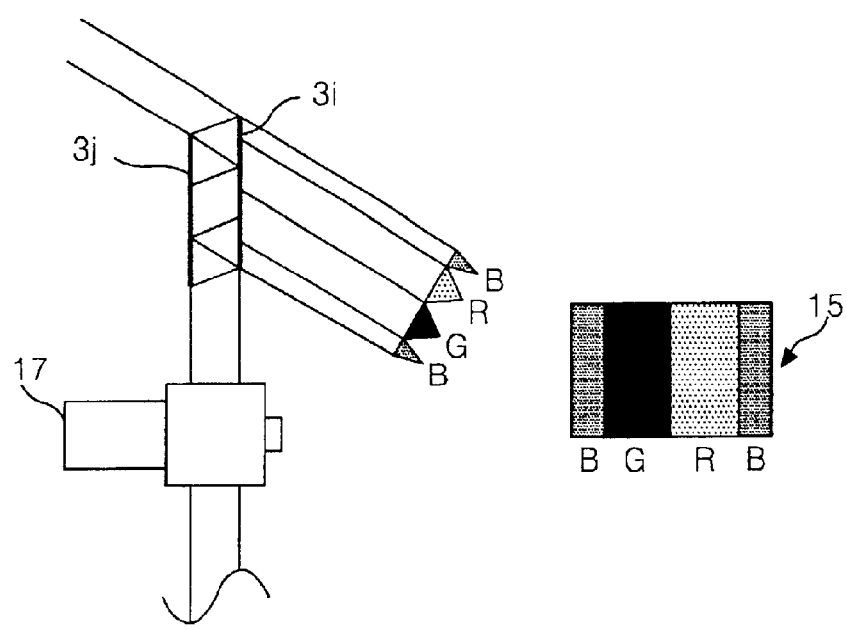

The color filter 3i positioned at 'b' area in FIG. 14 is coated with a red color 3r and a green color 3g being adjacent to each other at the same width and a blue color 3b formed at each side thereof with having the red color 3r and the green color 3g therebetween. Accordingly, a white light inputted from the color wheel 3 as shown in FIG. 15B allows the red(R) light and the green(G) light to be emitted adjacently at the same width while allowing the blue(B) light to be emitted with being separated into each side thereof with having the red(R) light and the green(G) light. The imaged plane 15 according to the emitted color light is made on the LCD device 9, the red(R) and green(G) colors being adjacent to each other at the same width and the blue(B) color formed at each side thereof with having the red(R) color and the green(G) color therebetween are imaged on the LCD device 9.

Figure 15C:
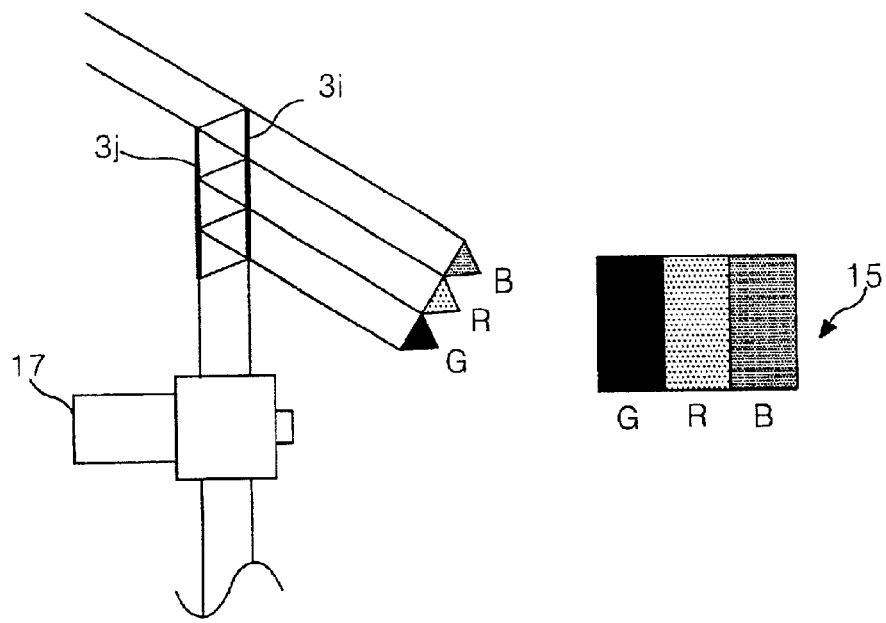

The color filter 3i positioned at 'c' area in FIG. 14 is coated with blue, red and green colors 3b, 3r and 3g at the same width. Accordingly, a white light being inputted as shown in FIG. 15C allows the corresponding color lights having the same magnitude to be emitted from the blue(B), red(R) and green(G) areas. When the imaged plane 15 according to the emitted color lights is made on the LCD device 9, blue(B), red(R) and green(G) lights having the same width are imaged on the LCD device 9.

Figure 15D:
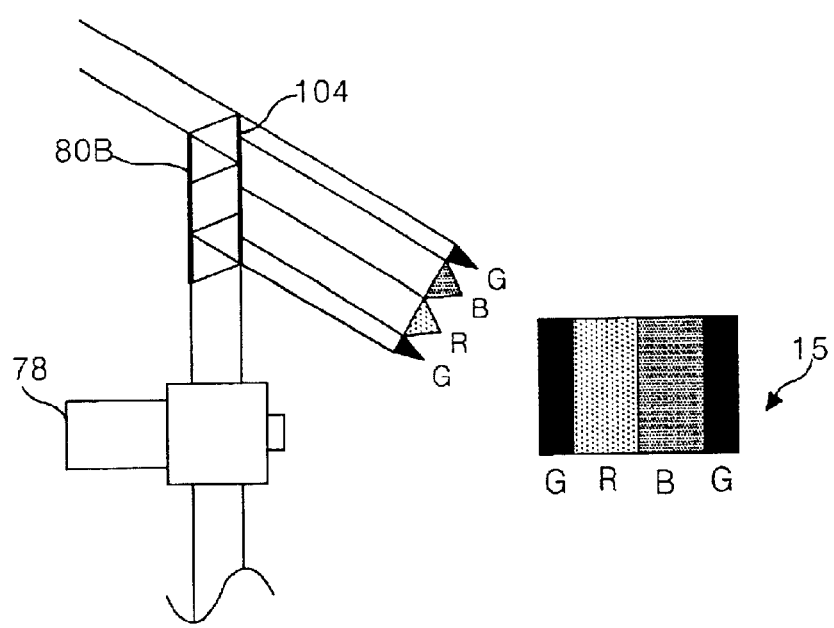

The color filter 3i positioned at 'd' area in FIG. 14 is coated with a red color 3r and a blue color 3b being adjacent to each other at the same width and a green color 3g formed at each side thereof with having the red color 3r and the blue color 3b therebetween. Accordingly, a white light inputted from the color wheel 3 as shown in FIG. 15D allows the red(R) light and the blue(B) light to be emitted adjacently at the same width while allowing the green(G) light to be emitted with being separated into each side thereof with having the red(R) light and the blue(B) light. The imaged plane 15 according to the emitted color light is made on the LCD device 9, the red(R) and blue(B) colors being adjacent to each other at the same width and the green(G) color formed at each side thereof with having the red(R) color and the blue(B) color therebetween are imaged on the LCD device 9.

Figure 15E:
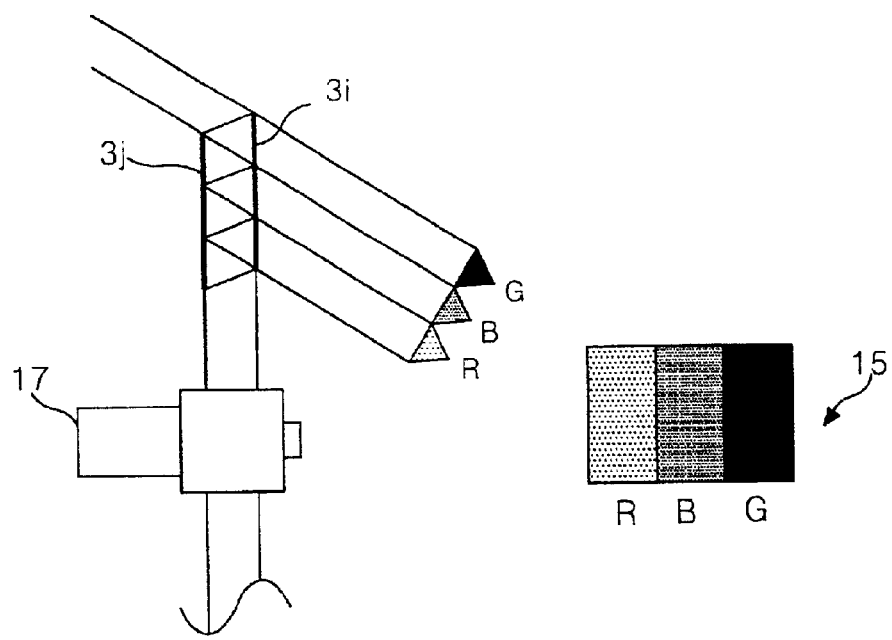

The color filter 3i positioned at 'e' area in FIG. 14 is coated with green, blue and red colors 3g, 3b and 3r at the same width. Accordingly, a white light being inputted as shown in FIG. 15E allows the corresponding color lights having the same magnitude to be emitted from the green(G), blue(B) and red(R) areas. When the imaged plane 15 according to the emitted color lights is made on the LCD device 9, green(G), blue(B) and red(R) lights having the same width are imaged on the LCD device 9.

Figure 15F:
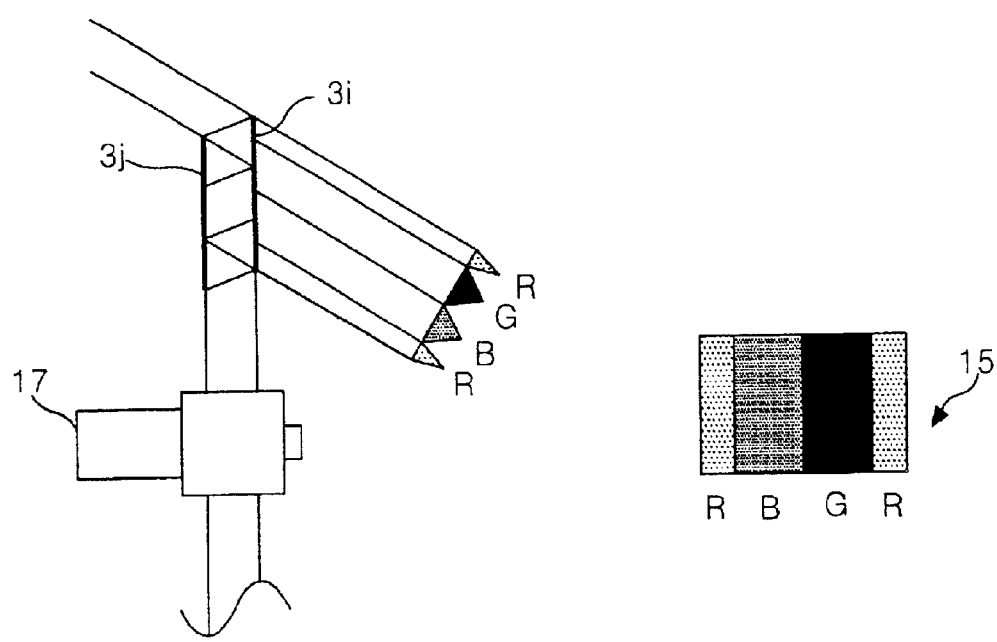

The color filter 3*i* positioned at 'f' area in FIG. 14 is coated with a green color 3*g* and a blue color 3*b* being adjacent to each other at the same width and a red color 3*r* formed at each side thereof with having the green color 3*g* and the blue color 3*b* therebetween. Accordingly, a white light inputted from the color wheel 3 as shown in FIG. 15F allows the green(G) light and the blue(B) light to be emitted adjacently at the same width while allowing the red(R) light to be emitted with being separated into each side thereof with having the green(G) light and the blue(B) light. The imaged plane 15 according to the emitted color light is made on the LCD device 9, the green(G) and blue(B) colors being adjacent to each other at the same width and the red(R) color formed at each side thereof with having the green(G) color and the blue(B) color therebetween are imaged on the LCD device 9.

Since the color filters of the color wheel 3 are rotated at a fast speed as mentioned above, red, green and blue colors coated on the color filters are moved with going toward the center direction. If the LCD device applies a color signal to each pixel in synchronization with such a movement of the red, green and blue colors coated on the color filters, then the color signals are averaged on a time basis to be recognized as a color.

As described above, according to the present invention, color lights can be transmitted with no light loss to thereby enhance a light efficiency by approximately twice to three times in comparison to the prior art. Also, it becomes possible to improve a reliability of picture realization. Moreover, it becomes possible to reduce a manufacturing cost.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A color wheel apparatus, comprising:
 a color filter portion in which color filters for selectively transmitting red, green and blue colors are sequentially formed on a single circular plate in a spiral shape with respect to a rotation axis of the circular plate; and
 a driving portion for rotating the circular plate.

2. The color wheel apparatus as claimed in claim 1, further comprising a reflective plate for reflecting a light reflected from an incident light to the color filter portion into the color filter portion again.

3. The color wheel apparatus as claimed in claim 1, wherein the reflective plate has a smaller size than the color filter portion.

4. The color wheel apparatus as claimed in claim 1, wherein a plurality of color filters are formed along a radial direction of the color filter portion, and wherein a plurality of colors are filtered in the radial direction.

5. The color wheel apparatus as claimed in claim 4, wherein the color filters simultaneously filter red, green and blue colors in a prescribed time interval.

6. A color-separating apparatus for a liquid crystal projector of single panel type, comprising:

a color wheel including a color filter in which red, green and blue colors are sequentially formed on a single circular plate in a spiral shape, and a reflective plate opposed to the color filter to reflect an incident light reflected and emitted from the color filter into the color filter again;
 a condensing lens for focusing a color light emitted from the color wheel;
 a polarizing prism for reflecting and transmitting an incident light inputted from the condensing lens in accordance with a polarized direction;
 a display device for reflecting the color light reflected from the polarizing prism and being incident thereto in accordance with an image signal to implement a picture light loaded with picture information; and
 a projective lens for projecting the picture light from the display device on an expanded scale.

7. The color-separating apparatus as claimed in claim 6, wherein the color filter takes a spiral shape in which red, green and blue colors are entered toward the rotation center direction.

8. The color-separating apparatus as claimed in claim 6, wherein the color filter is provided on a circular plate, and the reflective plate is provided at the rear side of the circular plate.

9. The color-separating apparatus as claimed in claim 6, wherein the reflective plate has a relatively smaller size than the color filter.

10. The color-separating apparatus as claimed in claim 6, wherein first, second and third color filter portions form the color filter, and wherein a plurality of color filter portions exist in the color wheel sequentially positioned in a radial direction from an inner radial portion of the color wheel to an outer radial portion of the color wheel.

11. A color-separating apparatus for a liquid crystal projector of single panel type, comprising:
 a color wheel having a color filter portion in which color filters for selectively transmitting red, green and blue lights are sequentially formed on a circular plate in concentric circles; and
 a driving portion for rotating the circular plate.

12. The color-separating apparatus as claimed in claim 11, further comprising:
 a reflective plate for reflecting a light reflected from an incident light to the color filter portion into the color filter portion again.

13. The color-separating apparatus as claimed in claim 11, wherein the color wheel has the red, green and blue concentric circles spaced at the same distance d (wherein d is a positive number meeting a relationship of d>0).

14. The color-separating apparatus as claimed in claim 11, wherein a rotation axis of the color wheel makes a non-axial rotating motion at a position spaced at the same distance d from a center axis of the concentric circles.

15. The color-separating apparatus as claimed in claim 11, further comprising:
 a condensing lens for focusing a color light emitted from the color wheel;
 a polarizing prism for reflecting and transmitting an incident light inputted from the condensing lens in accordance with a polarized direction;
 a display device for reflecting the color light reflected from the polarizing prism and being incident thereto in accordance with an image signal to implement a picture light loaded with picture information; and a projective lens for projecting the picture light from the display device on an expanded scale.

16. The color-separating apparatus as claimed in claim 11, wherein the color wheel includes five color areas consisting of red, green, blue, red and green color areas to image an illuminating light on three areas of the five color areas.

17. The color-separating apparatus as claimed in claim 11, wherein the color filters simultaneously filter red, green and blue colors in a prescribed time interval.

* * * * *